March 13, 1962 F. J. KANDRA 3,024,879
METHOD OF CLOSING OR JOINING INTEGRATED METAL CORE
PANELS AND THE STRUCTURE PRODUCED
Filed April 9, 1959
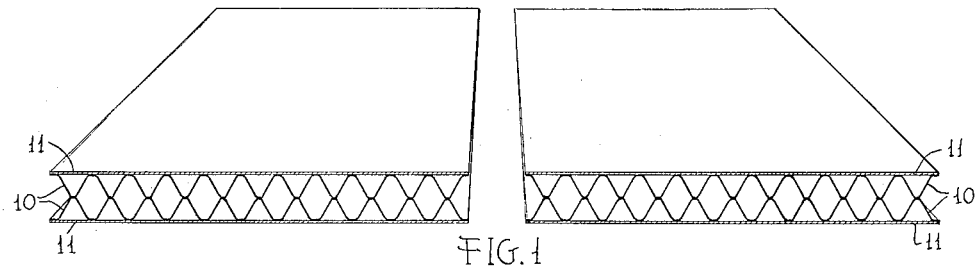
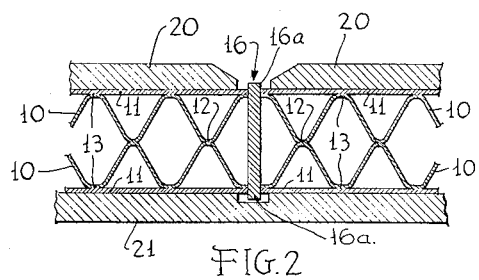
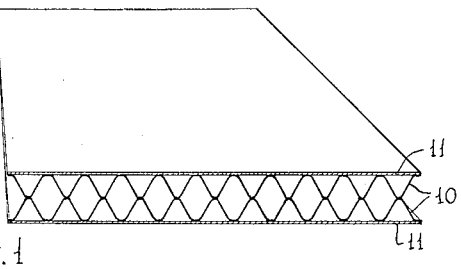
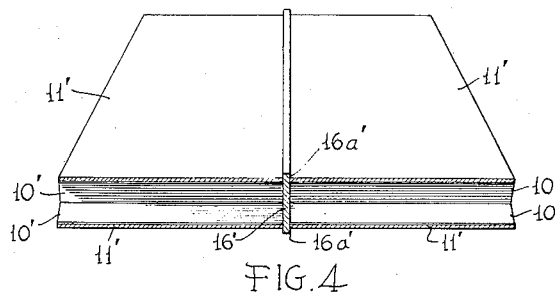
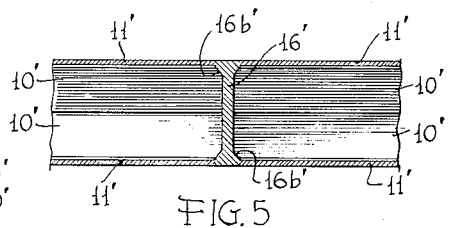
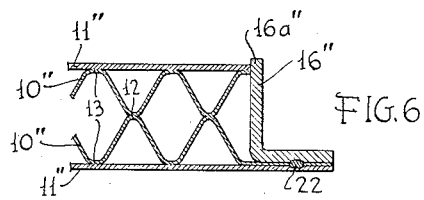
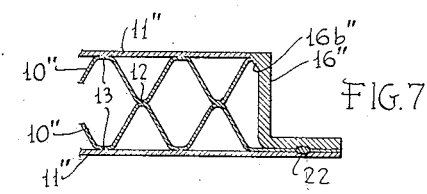
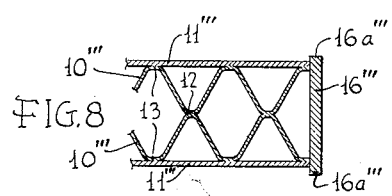
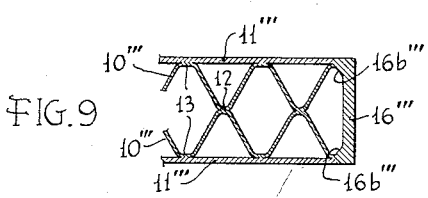
INVENTOR.
Fred J. Kandra
BY
Wm. R. Glisson
ATTORNEY

United States Patent Office 3,024,879
Patented Mar. 13, 1962

3,024,879
METHOD OF CLOSING OR JOINING INTEGRATED METAL CORE PANELS AND THE STRUCTURE PRODUCED
Fred J. Kandra, Philadelphia, Pa., assignor to The Budd Company, Philadelphia, Pa., a corporation of Pennsylvania
Filed Apr. 9, 1959, Ser. No. 805,189
5 Claims. (Cl. 189—36)

This invention relates to a method of closing or joining integrated metal core panels and the structure produced and has for an object the provision of improvements in this art. The integrated core panels with which the invention is especially concerned comprise a core and a cover sheet on one or both sides, the skin and core sheets being very thin and difficult to weld without turning through by the usual welding procedures.

One of the particular objects is to form an end or edge closure or joint for core panels made of very thin metal without burning the metal away in places.

Another object is to provide welded closures or joints which are very strong.

Another object is to provide a closing or joining method which can be easily and effectively practiced, even by relatively unskilled operators.

The above and other objects and advantages of the invention will be apparent from the following description of an exemplary embodiment, reference being made to the accompanying drawings wherein:

FIG. 1 is a section through two core panels which are to be joined together;
FIG. 2 is an enlarged section through an assembly ready for welding on one side;
FIG. 3 is a section like FIG. 2 but showing a completed assembly;
FIG. 4 is a section of end-abutting assemblies in preparation for welding;
FIG. 5 is a section of the FIG. 4 construction after welding;
FIG. 6 is a section of a panel ready for an end closure operation;
FIG. 7 is a section of the completed assembly of FIG. 6;
FIG. 8 is a section of another edge-closing assembly; and
FIG. 9 is a section of the completed assembly of FIG. 8.

The method is especially suited for closing and joining integrated core panels formed of very thin metal for use as blankets or sandwiches for aircraft and spacecraft. Stainless steel is one kind of metal used in forming such panels. In the examples shown herein the panel is formed of a corrugated core 10 and an outer skin sheet 11 on one or both sides. In the present case the core is formed of two corrugated sheets spot welded together, as at 12, on a central plane and welded to the skin sheets, as at 13, at their outer corrugations. Of course, cupped sheets may be used as well as fully corrugated sheets, as is known in practice.

The panels are brought together with a thin metal joint sheet 16 between them, as shown in FIG. 2. The joint sheet extends a short distance above the surface of the assembly, as shown at 16a, to provide excess metal for making the joint.

Heliarc welding is used to make the joint and the outer zone around the arc is blanketed by helium or other inert gas, in known manner. Also the interior spaces are filled with suitable inert gas to prevent oxidation. Heat dissipating bars, 21 below and 20 above, of a good conducting material, such as copper, are provided to keep the panels cool except at the welding zone.

The joint sheet 16 can be of the same material as the panel metal but joints can be made with different metals. For example, copper can be used for joining stainless steel panels.

FIG. 3 shows the completed joint. Here it is seen that the projections 16a have been completely removed down to about the surface level of the panels and fillets 16b have been formed inside the skin sheets. If there are engaging metal elements inside the skin sheets the molten metal will creep down along them and weld them together for a considerable distance within the skin sheets. After welding the outer surface is ground off smooth.

FIGS. 4 and 5 show a joint in which the core elements are joined end-to-end. Here the fillets 16b' are shown to extend well down along the abutting metal elements. In this case all core spaces must be filled with inert gas rather than the spaces near the weld zone as in FIGS. 1-3, in order to protect the weld zone completely.

FIGS. 6 and 7 show how the same method is used in making edge closures. And herein the term "edge" will be considered to include both side and end edges. Here an angle joint member 16" is welded at 22 to one skin sheet 11" and has an extension 16a" which after welding forms the fillet 16b".

FIGS. 8 and 9 show a square end closure in which the joint strip 16'" has an extension 16a'" at both edges to form fillets 16b'".

Various compound joints and joints with outer attachments can be formed by the present method, the basic joint or closure being effected by the method.

It is thus seen that the invention provides a simple and effective method of joining or closing panels formed of very thin metal and that a very strong joint is produced. Herein the term "joint" will include either a medial joint between adjacent sections or an edge closure joint, the same principles largely applying in all cases.

While certain embodiments have been described for purposes of illustration it is to be understood that there may be various embodiments and modifications within the general scope of the invention.

What is claimed is:
1. The method of forming an abutting edge joint on an integrated thin metal sandwich panel having a core and at least one thin skin cover sheet, which comprises, placing a relatively thick joint sheet across an edge of the panel and skin sheet, the joint sheet having its body portion disposed below the skin sheet and an edge protruding above the surface of said skin sheet, protecting the weld zone inside and out against contamination, and melting down the protruding edge of the joint sheet to the surface of the skin sheet immediately adjacent thereto to form a joint between the skin sheet and the joint sheet with a fillet of fused metal integral with the fused metal of the joint between the side of the joint sheet and the under side of the skin sheet.

2. The method as set forth in claim 1 which further includes the step of covering the panel except at the weld zone with large metal elements of high heat conductivity which keep the panel cool except at the immediate welding zone, the under side of the skin sheet being free of heat conducting means except the panel structure and the body of the joint sheet.

3. The method of forming an abutting edge joint between two integrated thin metal sandwich panels each having a corrugated core and at least one thin skin cover sheet, which comprises, assembling the panels together with a relatively thick transverse joint sheet between the abutting ends of the core elements and skin sheets, the joint sheet having its body portion disposed below the skin sheets and an edge protruding beyond the outer surface of the skin sheets, protecting the weld zone inside and out against contamination, and melting down the protruding edge to the surface of the skin sheets to form a joint between the skin sheets and to form inside fillets between the sides of the joint sheet and the under side of the skin sheets and joints between the sides of the joint sheet and the ends of the core elements.

4. A welded joint structure for an integrated thin metal core panel having a core and at least one thin skin sheet, a relatively thick joint strip abutting across an edge of said skin sheet of the panel, and weld metal fillet joints superimposed upon the original abutting joint securing the skin sheet interiorly to the joint strip.

5. A welded joint structure as set forth in claim 4, which further includes core elements abutting the joint strip at their ends and welded by said fillets adjacent the skin sheet to the joint strip.

References Cited in the file of this patent

UNITED STATES PATENTS

| | | |
|---|---|---|
| 1,980,561 | Wagner | Nov. 13, 1934 |
| 1,981,850 | Fisher | Nov. 27, 1934 |
| 2,145,937 | Lockwood | Feb. 7, 1937 |
| 2,206,375 | Swift | July 2, 1940 |
| 2,691,214 | Schnell et al. | Oct. 12, 1954 |
| 2,749,422 | Saives | June 5, 1956 |